United States Patent Office 2,874,129
Patented Feb. 17, 1959

2,874,129

PREPARATION OF CATALYSTS FOR METHANETHIOL SYNTHESIS

Richmond T. Bell, Grayslake, Ill., assignor to The Pure Oil Company, Chicago, Ill., a corporation of Ohio No Drawing. Application May 27, 1953
Serial No. 357,900

8 Claims. (Cl. 252—454)

This invention relates to a method of preparing supported catalysts and particularly to a method of preparing catalysts whereby a greatly extended, more uniform, rugged, and permanent active surface is imparted to the catalyst through its preparation using an impregnant solvent or liquid vehicle having a low surface tension at impregnating temperatures.

It is common practice in the preparation of a catalyst to utilize an aqueous solution or suspension of an active component, or parent compound thereof, to impregnate a support material, dry the impregnated support, and thermally decompose or chemically convert the impregnant within the interstices of the support to the oxide or other active component desired. In some instances the support is not inert but also functions as a major active component, and the impregnant, or catalyst component derived therefrom, is present in small amount as a promoter. In such cases, there may be a combination of the promoter and the support at the surface which modifies the surface lattice structure to produce superior activity for accelerating the rate of the reaction under consideration. Regardless of such considerations, however, where a catalyst is prepared involving deposition of one or more components in minor amount on and within a sub-strate, inert or active, by means of solutions or slurries, the method of this invention provides an improved catalyst.

With ordinary aqueous solutions or suspensions of high surface tension, penetration of the finer pores and capillaries of the sub-strate is comparatively incomplete, and wetting of the surfaces is inefficient. Consequently, more of the active component or promoter is deposited on the more easily accessible surfaces and the deposit adheres to the surfaces less strongly than is desirable with the result that there is an excessive loss of the active component in "fines," both in the preparation and handling, and in operation. Such loss is more marked with the fluidized solids technique and moving catalyst beds where there is generally greater attrition of the catalyst particles.

In addition, catalysts prepared using liquid vehicles of high surface tension may exhibit excessively great temperature differences at various points or areas within the body of catalyst, probably as a result of inefficient, non-uniform distribution of the active component and its penetration into the sub-strate. In commercial operation, disposal of the heat from such "hot spots," with the goal of an even temperature throughout the catalyst bed, constitutes a serious problem. Furthermore, neither the activity or the length of life is as great as can be achieved with given quantities of the catalyst components.

Accordingly, a fundamental object of this invention is to provide a method of preparing a catalyst which produces a catalytic material having greater resistance to erosion and less subject to loss of active components in "fines" resulting from handling and operation by a novel alteration in the conventional manipulative steps.

Another object of this invention is to provide a method of preparing a catalyst exhibiting more uniform temperature characteristics throughout its mass during use by impregnating a support with a solution or suspension of an active component in a liquid of low surface tension.

It is another object of this invention to produce catalysts having longer life at activities sufficient for economical operation and greater average activity over said life period.

A further object of this invention is to prepare catalysts having activity for accelerating vapor-phase organic or inorganic reactions wherein water is a product of reaction.

Still another object of this invention is the provision of a method of preparing oxide catalysts of metals of groups IV-A and VI-A of the periodic table, and of manganese, vanadium, aluminum, zinc, and cadmium, for use in organic syntheses, such as the preparation of organic sulfur compounds from alcohols or phenols by reaction with hydrogen sulfide.

Other objects and advantages of the invention will in part be obvious from the description to follow or be inherent therein.

The invention, accordingly, comprises the method of preparing a catalyst which inclues the steps and the relationship of the steps to each other and of the ingredients to the steps and the conditions thereof and to each other, as will hereinafter be described in detail. Specifically, the invention comprises a method of preparing catalysts on a supporting material wherein the impregnation step is carried out using as a solvent, or suspending vehicle for the active, or minor catalyst component a liquid which has a surface tension of not over 30 dynes/cm. at temperatures between 68° F. and impregnating temperatures. It is generally preferable to use an impregnant solvent with as low a boiling point as possible in order to expedite drying and decomposition, and minimize local overheating. The temperature of impregnation is maintained at about 10° to 30° F. below the boiling point of the liquid under the conditions used.

One type of catalyst which can be prepared by the present process is that capable of splitting off water in organic reactions. Such catalysts are often metallic oxides prepared from compounds which are converted to the oxide on the application of heat. Accordingly, the invention includes as one embodiment the decomposition of metallic hydroxides, alcoholates, nitrites, nitrates, and metal salts of organic carboxylic acids, such as acetates and oxalates, to the active metal oxides within a support. Among other types of reactions, such catalysts are used in processes where the desired reaction product can be considered to be formed as a result of the elimination of the components of water (e. g., H and OH or $H_2$ and O), as water, from one or more reactants, i. e., splitting out of water, such as the reaction of hydrogen sulfide with oxy- or hydroxy-organic compounds to form organic sulfur compounds, as in the synthesis of methanethiol from methanol and hydrogen sulfide, the synthesis of 2-thiapropane from methanol and hydrogen sulfide, or the synthesis of 2-thiapropane from methyl ether and hydogen sulfide; the reaction of alcohols to form unsaturated hydrocarbons; and the reaction of alcohols to form ethers.

For example, the method of this invention may be used to prepare catalysts containing the oxides of thorium, zirconium, titanium, uranium, tungsten, molybdenum, and chromium, which metals are classified in the preferred groups IV-A and VI-A, and may also be used to prepare catalysts containing oxides of zinc, cadmium, aluminum, vanadium, and manganese appearing in groups II, III, V, and VII. These catalysts are generally effective for purposes of carrying out various organic synthesis reactions in which water results as a by-product of reaction, particularly the synthesis of methanethiol from methanol and hydrogen sulfide. In these synthesis, the aforementioned oxides or their mixtures may be used.

With some of the metals, several oxides representing low, intermediate, and high states of oxidation are possible. In some instances these oxides are well defined, and in others are more in the nature of consistent molar compounds or mixtures. The intermediate oxides, whether definite compounds or mixtures of constant composition, are preferred in the methanethiol synthesis. Zirconium dioxide is the only well established oxide of zirconium, but in any event is the preferred oxide. Titanium forms four well defined oxides: TiO, $Ti_2O_3$, $TiO_3$, and titanium dioxide ($TiO_2$), but in this case the last is preferred. Likewise, uranium, tungsten, and molybdenum form several oxides which may be utilized in accordance with the present invention. One series of "blue oxides" of tungsten is intermediate between tungsten monoxide and tungsten dioxide and includes $W_4O_3$, WO (or $W_2O \cdot WO_2$), $W_2O_3$, $W_5O_9$, and $W_5O_8$. Another series of "blue oxides" is intermediate between tungsten dioxide and tungsten trioxide and includes $W_2O_5$, $W_3O_8$, $W_4O_{11}$, and $W_5O_{14}$. These intermediate, "blue oxides" of tungsten are preferred forms for accelerating organic reactions of the aforementioned type. The "blue oxides" of molybdenum—for example, $MoO_2$, $Mo_3O_8$, $Mo_2O_5$ ($MoO_2.MoO_3$), and $Mo_5O_{14}$ ($MoO_2.4MoO_3$), are preferred molybdenum oxide catalysts that may be utilized by following the method described herein. Molybdenum tritaoctoxide, $Mo_3O_8$, commonly called "molybdenum blue" has the unusual and desirable property of being soluble in a large number of organic solvents, including alcohols.

In order to further illustrate the invention, the synthesis of methanethiol from methanol and hydrogen sulfide is described. In this reaction, methanol and hydrogen sulfide are conducted over a metallic oxide catalyst to produce methanethiol and dimethyl thioether (2-thiapropane). In the preparation of catalysts for a given reaction, it is advantageous when the active component, or parent compound thereof, is soluble in one of the reactants, and such a solution is preferably used to impregnate the support providing the surface tension of the impregnant solvent is not over 30 dynes/cm. For this particular reaction, then, thorium salts such as nitrate and oxalate, and "molybdenum blue" ($Mo_3O_8$) are especially advantageous for the preparation of catalysts according to the method of this invention since they are soluble in methanol.

The reaction may be carried out at temperatures between about 575° and 850° F., liquid hourly volume space velocities between about 0.05 and 1.5, superatmospheric, atmospheric, or subatmospheric pressures, and hydrogen sulfide:methanol mol ratios between 10:1 and 1:10. LHV space velocity is defined as the liquid volume (60° F.) of the alcohol charged per hour per unit volume of catalyst. In general, preferred conditions are as follows: temperatures between 700° and 775° F., LHV space velocities between 0.2 and 0.7, pressures between 50 and 200 p. s. i. g., and hydrogen sulfide:methanol mol ratios between 2:1 and 2:3.

In order to illustrate the invention more specifically, the preparation and use of several catalysts will be described. As has been mentioned in connection with "molybdenum blue" ($Mo_3O_8$), when an active component such as a metallic oxide, or the parent compound of an active component, is soluble to an appreciable extent in a relatively volatile organic solvent of low surface tension, the efficient impregnating solution so prepared demonstrates one very effective application of the method of this invention. When said organic solvent can be one of the reactants in the process under consideration, it is especially advantageous in that there is no contamination by an extraneous material, and any possible reduced catalyst activity therefrom is minimized.

Such a case is represented by the use of a thorium dioxide catalyst for the production of methanethiol and 2-thiapropane from methanol and hydrogen sulfide. Even at ordinary temperatures such as 77° F., thorium nitrate tetrahydrate is very appreciably soluble in a number of oxygen-containing organic solvents. For example, in the aliphatic alcohols, methyl, ethyl, n-propyl, allyl, isopropyl, n-butyl, isobutyl, isoamyl, and n-hexyl, the weight percent of thorium nitrate in a saturated solution at 77° F. is 65.7, 55.6, 47.0, 45.8, 44.4, 44.6, 39.9, 37.8, and 33.4, respectively. Even at temperatures as low as 68° F., the surface tensions of these alcohols with respect to air or vapor are below 30 dynes per centimeter, and the surface tensions decrease with increase in temperature. Thus, for the reaction of hydrogen sulfide with methanol, a thoria catalyst can be prepared using methanol as the solvent in the impregnating solution; for the reaction with ethanol, ethanol can be used as the solvent for thorium nitrate tetrahydrate; for the reaction of isopropanol, isopropanol is used as the thorium nitrate tetrahydrate solvent; and so on for the various alcohols to be reacted with hydrogen sulfide as long as the surface tension of the solvent at impregnating temperature is below about 30 dynes per centimeter.

For one specific example of this invention, 8–16 mesh pumice is screened to remove any particles finer than 16 mesh, and the pumice is extracted with approximately 20 percent hydrochloric acid in an extraction apparatus, such as a Soxhlet extractor, until the acid extract is negative (no blue color) when a drop is tested for iron with a drop of 0.5 N potassium ferrocyanide solution. This test detects as low as one part in a million of iron, and for all practical purposes the pumice so purified is free of iron and other metals or compounds extractable with hot, 20 percent hydrochloric acid. The pumice is washed with water until washings are negative for chloride (as tested for with silver nitrate solution), and dried in an oven at 230° F. A 25% by weight solution of 204.1 g., of thorium nitrate tetrahydrate in methanol is then added to 300 g. of purified pumice at a temperature of about 120° to 140° F., and the mixture is maintained at this temperature, with constant stirring, to thoroughly impregnate the pumice and slowly evaporate the methanol. When the mixture is dry as observed, it is further dried, with occasional stirring, for 8 to 16 hours in an oven at 230° F.

The dry thorium nitrate on pumice is slowly heated to about 500° to 525° F., while passing air through it, and is held at this temperature until the exit gas is negative to tests for acidic constituents and/or for oxides of nitrogen. Thereafter, the temperature is gradually increased to about 750° F., and maintained there for 1 to 2 hours after exit gases are free of acidigenic substances. The resulting thoria-on-pumice catalyst, containing about 7.6 mol percent of thoria (using 67.7 as the molecular weight of purified pumice), is then ready for use.

With such a catalyst, the reaction of methanol and hydrogen sulfide to form methanethiol and 2-thiapropane may be carried out with a liquid hourly volume space velocity of 0.35, a temperature of 725° F., a pressure of 100 p. s. i. g., a hydrogen sulfide:methanol mol ratio of 2:1, and with 0.36 mol percent of water in the entering reactant mixture to promote and prolong the activity and selectivity of the catalyst. Under these conditions, methanethiol yields of about 38 percent and selectivities of about 85 percent are attained over a period of operation of at least 265 hours with no diminution in catalytic activity or selectivity.

At 716° F., LHV space velocity of 0.30, atmospheric pressure, 1:1 mol ratio of hydrogen sulfide:methanol, and with 0.5 mol percent of water in the entering reactant mixture, methanethiol yields of around 32 percent and selectivities around 87 percent are obtained with a similarly prepared thoria-on-pumice catalyst containing 6.8 mol percent thoria.

Another example is afforded by the preparation of a catalyst comprising thoria supported on activated alumina. A 33 percent solution of thorium nitrate tetrahydrate (156.8 g.) in methanol is added to 340 g. (425 ml) of Alorco F–10, 8–14 mesh, activated alumina, and the mixture is stirred at 120° to 140° F. until all the methanol is evaporated. The alumina impregnated with thorium nitrate is slowly heated up to a temperature of 518° F. and maintained at that temperature, while passing air through the bed, until the exit gases are only slightly acidic to moist litmus paper, or are free of acidic components, and give only a weakly positive, or negative, specific test result for nitrous acid. Thereafter, the temperature is increased to 716° F. and maintained there until the exit gases are neutral to moist litmus and give a negative result for nitrous acid. The resulting thoria-on-alumina catalyst contains 7.6 mol percent thorium dioxide (using 99.73 for the molecular weight of the alumina as calculated from the manufacturer's analysis).

With such a catalyst at 750° F., LHV space velocity of 0.3, atmospheric pressure, 2:1 mol ratio of hydrogen sulfide:methanol, and with 0.36 mol percent of water in the entering reactant mixture, methanethiol yields of about 50 to 55 percent and selectivities of about 85 to 90 are obtained.

The foregoing catalysts as used in the specific applications given are more uniform in activity throughout their masses and are longer lived at a given level of activity than similar catalysts prepared using a liquid of high surface tension, viz, water, as the solvent for the impregnant. However, because of the unique, marked response of metallic oxide catalysts having predominant activity for accelerating reactions in which water is split out, such as thoria, to the introduction of small amounts of water in the entering reactant mixture, improvements in yield and selectivity resulting from the method of this invention may be obscured by the improvements in these two respects resulting from the addition of water in small amounts to the entering reactant mixture.

Nevertheless, the benefits of this invention with respect to increased yield and selectivity, as well as with respect to length of life, ruggedness, and more uniform activity, can be demonstrated for supported metallic oxide catalysts in this type of reaction by carrying out the reaction of methanol and hydrogen sulfide without a small amount of water in the entering reactant mixture and under the same conditions over each of two catalysts, one prepared using water alone (high surface tension) as the solvent for the thorium nitrate, and the other prepared using water in which is dissolved the small amount of surfactant sufficient to bring the surface tension down below about 30 dynes/cm. For example, 0.1 percent of dioctyl sodium sulfosuccinate is used to bring the surface tension down to about 29 dynes/cm. Without water in the reactant mixture, both of these catalysts lose much of their activity within a short time in comparison to the much longer life with a proper amount of water added to the reactant mixture, but the life, activity, uniformity of activity, and selectivity of the catalyst prepared with the impregnant solvent of low surface tension are definitely greater than with the catalyst prepared using the impregnant solvent of high surface tension (water alone).

When an impregnant solvent of low surface tension is prepared by using surfactants containing a metallic atom, the quantity of agent required is usually so small that the quantity of metallic compound resulting therefrom by thermal decomposition, e. g., oxide, carbonate, sulfate, etc., is well within the quantities of the same or other metallic compounds already present as impurities in supporting materials such as activated alumina, bauxite, kieselguhr, clays, pumice, etc. In one of the above specific examples, for instance, 0.1 percent of dioctyl sodium sulfosuccinate in 612.3 g. of water is equivalent to 0.093 g. of sodium sulfate, or 0.043 g. of sodium oxide. These quantities calculate to 0.031 percent by weight and 0.014 percent by weight, respectively, of the 300 g. of pumice used as support. With 340 g. of activated alumina as support and 0.1 percent of dioctyl sodium sulfosuccinate in 313.6 g. of water, the content of sodium compound deposited on the alumina is 0.015 percent by weight, calculated as sodium sulfate, and 0.006 percent by weight calculated as sodium oxide. As stated, these quantities are far less than the amounts of extraneous metallic compounds normally present as impurities in such supports and have no deleterious effect upon a metallic oxide catalyst in the synthesis of thiols from alcohols and hydrogen sulfide.

In general, however, when surfactants are employed to obtain an impregnant solvent or vehicle of low surface tension, it is preferable to use agents containing no metallic atom such as polyhydric alcohols, e. g., nonaethylene glycol mono-oleate or -laurate, or quaternary ammonium compounds or other nitrogenous bases, e. g., octadecyl ammonium chloride. Also in cases where absolutely no extraneous compound, such as a sodium or potassium compound, may be present in the catalyst, the alkyl aryl sulfonates and other surface-active agents ordinarily employed as the sodium salt may be used in the form of the ammonium salt.

The foregoing examples are illustrative only, and combinations of non-aqueous liquids and water, with or without surface-active agents, may be used as impregnant solvents or vehicles without departing from the essence of this invention as long as the surface tension of said solvent or liquid suspending vehicle is not greater than 30 dynes/cm. at the temperature of impregnation.

The invention, accordingly, comprises the combination of steps to prepare an active catalyst for use in promoting reactions, and includes the catalyst composition produced by this method, and encompasses the method of conducting reactions involving the use of the present catalyst compositions. The foregoing examples and description are not intended to limit the invention to the particular applications set forth. There have been shown means for preparing extended, uniform, and substantially permanent active surfaces within and upon a supporting material which may be used in reactions involving the splitting off of components of water, and the only limitations attaching to said means or method or catalyst are those appearing in the appended claims.

What is claimed is:

1. The method of preparing a catalyst consisting of an active component comprising the oxides of metals selected from the group consisting of thorium, zirconium, titanium, uranium, tungsten, molybdenum and chromium supported on a dry porous carrier material which comprises dissolving a heat-decomposable compound of said active component in a monohydric aliphatic alcohol having up to 6 carbon atoms to the molecule and a surface tension of not more than 30 dynes per centimeter, impregnating said dry carrier with said alcohol solution at a temperature of about 10° to 30° F. below the boiling point of the alcohol whereby the surface tension of the impregnating solution is not more than 30 dynes per centimeter at the impregnating temperature, heating said impregnated carrier to evaporate said alcohol therefrom and calcining said thus dried carrier material to convert the heat-decomposable compound to the corresponding metal oxide.

2. The method in accordance with claim 1 in which the aliphatic alcohol is selected from the group consisting of methyl alcohol, ethyl alcohol, n-propyl alcohol, n-butyl alcohol, iso-amyl alcohol and n-hexyl alcohol.

3. The method in accordance with claim 1 in which the porous carrier material is selected from the group consisting of pumice and alumina.

4. The method in accordance with claim 2 in which the aliphatic alcohol is methyl alcohol.

5. The method in accordance with claim 3 in which the porous carrier is alumina.

6. The method in accordance with claim 3 in which the porous carrier is pumice.

7. The method in accordance with claim 6 in which said pumice is free of metals soluble in hot 20% hydrochloric acid solution and free of the chloride ion.

8. The method of preparing a catalyst for use in the production of aliphatic thiols from the reaction of a monohydric aliphatic alcohol having up to 6 carbon atoms per molecule and hydrogen sulfide which comprises, dissolving a heat-decomposable compound of thorium in a monohydric alcohol corresponding to the aliphatic thiol being prepared and having a surface tension of not more than 30 dynes per centimeter, impregnating dry pumice with said alcohol solution of said thorium compound at a temperature of about 10° to 30° F. below the boiling point of the alcohol whereby the surface tension of the impregnating solution is not more than 30 dynes per centimeter at the impregnating temperature, heating said impregnated pumice to evaporate said alcohol therefrom and calcining said thus dried pumice to convert said thorium compound to thorium oxide.

References Cited in the file of this patent

UNITED STATES PATENTS

| | | |
|---|---|---|
| 2,532,497 | Hoekstra | Dec. 5, 1950 |
| 2,582,254 | Hunter | Jan. 15, 1952 |
| 2,592,646 | Bell | Apr. 15, 1952 |
| 2,593,314 | Kimberlin | Apr. 15, 1952 |
| 2,650,906 | Engel et al. | Sept. 1, 1953 |
| 2,690,433 | Engel et al. | Sept. 28, 1954 |
| 2,708,187 | Kearby | May 10, 1955 |
| 2,734,022 | Kimberlin et al. | Feb. 7, 1956 |